(12) United States Patent
Murashige et al.

(10) Patent No.: US 11,198,274 B2
(45) Date of Patent: Dec. 14, 2021

(54) OPTICAL LAMINATE HAVING THIN GLASS, POLARIZER, AND PROTECTIVE FILM WITH SPECIFIED MODULUS OF ELASTICITY

(71) Applicant: NITTO DENKO CORPORATION, Ibaraki (JP)

(72) Inventors: Takeshi Murashige, Ibaraki (JP); Junichi Inagaki, Ibaraki (JP); Kazuhito Hosokawa, Ibaraki (JP)

(73) Assignee: NITTO DENKO CORPORATION, Ibaraki (JP)

(*) Notice: Subject to any disclaimer, the term of this patent is extended or adjusted under 35 U.S.C. 154(b) by 0 days.

(21) Appl. No.: 15/743,804

(22) PCT Filed: Jul. 13, 2016

(86) PCT No.: PCT/JP2016/070641
§ 371 (c)(1),
(2) Date: Jan. 11, 2018

(87) PCT Pub. No.: WO2017/010499
PCT Pub. Date: Jan. 19, 2017

(65) Prior Publication Data
US 2018/0203173 A1 Jul. 19, 2018

(30) Foreign Application Priority Data
Jul. 15, 2015 (JP) .............. JP2015-141526

(51) Int. Cl.
*G02B 1/11* (2015.01)
*G02B 1/14* (2015.01)
(Continued)

(52) U.S. Cl.
CPC ............... *B32B 17/10* (2013.01); *B32B 7/12* (2013.01); *B32B 17/10018* (2013.01);
(Continued)

(58) Field of Classification Search
CPC .. B32B 7/02; B32B 7/12; B32B 17/06; B32B 17/064; B32B 17/10018; B32B 17/10458;
(Continued)

(56) References Cited

U.S. PATENT DOCUMENTS 8,314,987 B2   11/2012   Goto et al.
8,320,042 B2   11/2012   Goto et al.
(Continued)

FOREIGN PATENT DOCUMENTS

CN    101872035 A    10/2010
EP    2492250 A1    8/2012
(Continued)

OTHER PUBLICATIONS

English translation of International Search Report dated Sep. 27, 2016, issued in counterpart International Application No. PCT/JP2016/070641. (2 pages).
(Continued)

*Primary Examiner* — Ryan S Dunning
(74) *Attorney, Agent, or Firm* — Westerman, Hattori, Daniels & Adrian, LLP

(57) ABSTRACT

Provided is an optical laminate capable of contributing to reduction in weight and improvement in impact resistance of a display apparatus. The optical laminate includes a thin glass having a thickness of 100 μm or less and a polarizing plate arranged on one side of the thin glass, in which the polarizing plate includes a polarizer and a protective film arranged on a surface of the polarizer on a thin glass side. In one embodiment, the optical laminate of the present invention further includes an adhesion layer between the thin glass and the polarizing plate.

3 Claims, 1 Drawing Sheet

(51) Int. Cl.
    *G02B 5/30*     (2006.01)
    *B32B 17/10*     (2006.01)
    *B32B 27/30*     (2006.01)
    *B32B 27/36*     (2006.01)
    *B32B 23/04*     (2006.01)
    *B32B 27/08*     (2006.01)
    *B32B 7/12*     (2006.01)
    *H01L 51/50*     (2006.01)
    *C03C 17/32*     (2006.01)
    *H01L 51/52*     (2006.01)

(52) U.S. Cl.
CPC .. *B32B 17/10458* (2013.01); *B32B 17/10733* (2013.01); *B32B 23/046* (2013.01); *B32B 27/08* (2013.01); *B32B 27/30* (2013.01); *B32B 27/306* (2013.01); *B32B 27/308* (2013.01); *B32B 27/36* (2013.01); *C03C 17/32* (2013.01); *G02B 1/11* (2013.01); *G02B 1/14* (2015.01); *G02B 5/30* (2013.01); *G02B 5/3041* (2013.01); *H01L 51/50* (2013.01); *B32B 2307/40* (2013.01); *B32B 2307/544* (2013.01); *B32B 2307/546* (2013.01); *B32B 2307/558* (2013.01); *B32B 2307/732* (2013.01); *B32B 2367/00* (2013.01); *B32B 2457/20* (2013.01); *B32B 2457/202* (2013.01); *H01L 51/5237* (2013.01)

(58) Field of Classification Search
CPC . B32B 17/10733; B32B 23/046; B32B 27/08; B32B 27/30; B32B 27/306; B32B 27/308; B32B 27/36; B32B 2307/40; B32B 2307/544; B32B 2307/546; B32B 2307/558; B32B 2307/732; B32B 2367/00; B32B 2457/20; B32B 2457/202; C03C 17/28; C09J 163/00; G02B 1/11; G02B 1/14; G02B 5/30; G02B 5/3025; G02B 5/3033; G02B 5/3041; G02B 5/305; G02F 1/133528; H01L 51/50; H05B 33/04
USPC ............. 264/1.31, 1.34; 349/96; 359/483.01, 359/487.01, 487.02, 487.05; 428/1.3, 428/1.31, 337
See application file for complete search history.

(56) References Cited

U.S. PATENT DOCUMENTS

| | | | |
|---|---|---|---|
| 8,379,169 B2 | 2/2013 | Kitagawa et al. | |
| 8,411,360 B2 | 4/2013 | Kitagawa et al. | |
| 8,520,169 B2 | 8/2013 | Kitagawa et al. | |
| 8,520,171 B2 | 8/2013 | Kitagawa et al. | |
| 8,709,567 B2 | 4/2014 | Kitagawa et al. | |
| 8,721,816 B2 | 5/2014 | Kitagawa et al. | |
| 8,771,454 B2 | 7/2014 | Goto et al. | |
| 8,852,374 B2 | 10/2014 | Goto et al. | |
| 8,947,368 B2 | 2/2015 | Jeong et al. | |
| 9,023,168 B2 | 5/2015 | Kitagawa et al. | |
| 9,188,807 B2 | 11/2015 | Lu et al. | |
| 9,283,740 B2 | 3/2016 | Kitagawa et al. | |
| 9,442,234 B2 | 9/2016 | Kitagawa et al. | |
| 9,442,235 B2 | 9/2016 | Kitagawa et al. | |
| 9,459,390 B2 | 10/2016 | Kitagawa et al. | |
| 9,618,668 B2 | 4/2017 | Kitagawa et al. | |
| 9,744,750 B2 | 8/2017 | Kitagawa et al. | |
| 2008/0124541 A1* | 5/2008 | Peter .................. H05B 33/10 428/332 |
| 2010/0182252 A1 | 7/2010 | Jeong et al. | |
| 2012/0055607 A1 | 3/2012 | Kitagawa et al. | |
| 2012/0055608 A1 | 3/2012 | Kitagawa et al. | |
| 2012/0055621 A1 | 3/2012 | Goto et al. | |
| 2012/0055622 A1 | 3/2012 | Kitagawa et al. | |
| 2012/0055623 A1 | 3/2012 | Kitagawa et al. | |
| 2012/0056211 A1 | 3/2012 | Kitagawa et al. | |
| 2012/0056340 A1 | 3/2012 | Kitagawa et al. | |
| 2012/0057104 A1 | 3/2012 | Kitagawa et al. | |
| 2012/0057107 A1 | 3/2012 | Kitagawa et al. | |
| 2012/0057231 A1 | 3/2012 | Goto et al. | |
| 2012/0057232 A1 | 3/2012 | Goto et al. | |
| 2012/0058291 A1 | 3/2012 | Kitagawa et al. | |
| 2012/0058321 A1 | 3/2012 | Goto et al. | |
| 2012/0196103 A1 | 8/2012 | Murashige et al. | |
| 2013/0088670 A1 | 4/2013 | Lu et al. | |
| 2013/0100529 A1 | 4/2013 | Kitagawa et al. | |
| 2013/0114139 A1 | 5/2013 | Kitagawa et al. | |
| 2014/0098331 A1* | 4/2014 | Hisanaga ............... G02B 1/105 349/96 |
| 2014/0186568 A1 | 7/2014 | Kitagawa et al. | |
| 2015/0024149 A1 | 1/2015 | Watanabe et al. | |
| 2015/0072125 A1 | 3/2015 | Murashige et al. | |
| 2015/0183199 A1 | 7/2015 | Kitagawa et al. | |
| 2015/0219949 A1* | 8/2015 | Kim .................... B32B 38/0012 349/62 |
| 2016/0018578 A1* | 1/2016 | Yonemoto ................ B32B 7/12 359/487.02 |
| 2016/0054494 A1 | 2/2016 | Kitagawa et al. | |
| 2016/0103258 A1 | 4/2016 | Kitagawa et al. | |
| 2016/0209548 A1 | 7/2016 | Watanabe et al. | |

FOREIGN PATENT DOCUMENTS

| | | |
|---|---|---|
| JP | 2010-164938 A | 7/2010 |
| JP | 4691205 B1 | 6/2011 |
| JP | 2011-156862 A | 8/2011 |
| JP | 2013-121692 A | 6/2013 |
| JP | 2014-215592 A | 11/2014 |
| JP | 2015-7764 A | 1/2015 |
| KR | 10-2015-0003727 A | 1/2015 |
| WO | 2013/114979 A1 | 8/2013 |
| WO | 2014/084044 A1 | 6/2014 |
| WO | 2014/084045 A1 | 6/2014 |
| WO | 2014/084046 A1 | 6/2014 |
| WO | 2014/171504 A1 | 10/2014 |

OTHER PUBLICATIONS

Extended (supplementary) European Search Report dated Dec. 20, 2018, issued in counterpart European Application No. 16824479.6. (6 pages).
Office Action dated Feb. 1, 2019, issued in counterpart KR application No. 10-2018-7001352, with English translation. (11 pages).
Office Action dated Jul. 5, 2021, issued in counterpart CN application No. 201680041613.7 with English machine translation. (12 pages).

* cited by examiner

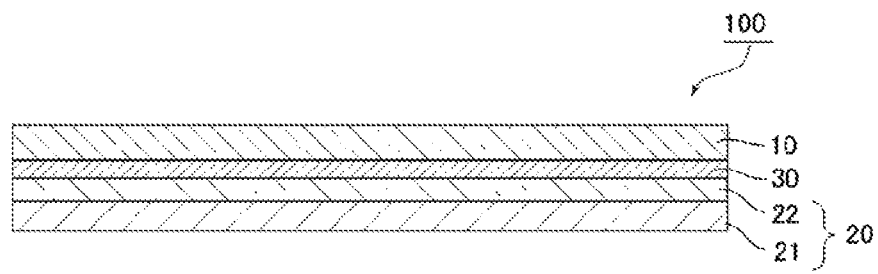

OPTICAL LAMINATE HAVING THIN GLASS, POLARIZER, AND PROTECTIVE FILM WITH SPECIFIED MODULUS OF ELASTICITY

TECHNICAL FIELD

The present invention relates to an optical laminate. More specifically, the present invention relates to an optical laminate including a polarizing plate.

BACKGROUND ART

In recent years, an information terminal, such as a smart phone or a tablet PC, has been widely used. In many cases, a protective material is arranged on the outermost surface side of such device in order to protect a display apparatus. The display apparatus to be incorporated in the above-mentioned device which is frequently carried around with one or operated while being held in one's hand has been increasingly required to be reduced in weight and improved in impact resistance year by year. Along with this, a protective material capable of meeting such requirements has been required. In addition, from the viewpoint of reducing the weight of the display apparatus in its entirety, a thin protective material having both a protective function and an optical function has been required.

A glass sheet or a plastic sheet is used as the protective material (see, for example, Patent Literature 1). Tempered glass having an increased strength as compared to general glass is used for the glass sheet. The glass sheet is excellent in impact resistance and hardness, but has a problem of having a high specific gravity and being heavy. In this connection, when a glass material is reduced in thickness for weight saving, there is a problem in that its impact resistance is remarkably reduced. A material which is excellent in transparency and has high strength, such as polymethyl methacrylate or polycarbonate, may be used for the plastic sheet. The plastic sheet is lighter than the glass sheet, but when the plastic sheet is used, it is difficult to achieve both impact resistance and hardness to be required for the protective material.

CITATION LIST

Patent Literature

[PTL 1] JP 2010-164938 A

SUMMARY OF INVENTION

Technical Problem

The present invention has been made to solve the conventional problems, and an object of the present invention, is to provide an optical laminate capable of contributing to reduction in weight and improvement in impact resistance of a display apparatus.

Solution to Problem

According to one embodiment of the present invention, there is provided an optical laminate, including a thin glass having a thickness of 100 μm or less and a polarizing plate arranged on one side of the thin glass, in which the polarizing plate includes a polarizer and a protective film arranged on a surface of the polarizer on a thin glass side.

In one embodiment, the optical laminate of the present invention further includes an adhesion layer between the thin glass and the polarizing plate.

In one embodiment, the adhesion layer contains an epoxy-based resin.

In one embodiment, the protective film has a modulus of elasticity at 23° C. of from 1.5 GPa to 10 GPa.

In one embodiment, the optical laminate of the present invention further includes an antireflection layer, in which the antireflection layer is arranged on a side of the thin glass opposite to the polarizing plate.

Advantageous Effects of Invention

According to the present invention, the optical laminate having a polarisation function can be provided. The optical laminate has a light weight and a high hardness, and is excellent in impact resistance. The optical laminate of the present invention can be suitably used as a front plate of a display apparatus, and can contribute to reduction in weight and improvement in impact resistance of the display apparatus while expressing a polarization function. In addition, the optical laminate of the present invention is excellent in flexibility, and hence can be provided in a roll form and is also excellent in handleability.

BRIEF DESCRIPTION OF DRAWINGS

FIG. 1 is a schematic sectional view of an optical laminate according to a preferred embodiment of the present invention.

DESCRIPTION OF EMBODIMENTS

A. Entire Construction of Optical Laminate

FIG. 1 is a schematic sectional view of an optical laminate according to one embodiment of the present invention. An optical laminate 100 includes a thin glass 10 having at thickness of 100 μm or less and a polarizing plate 20 arranged on one side of the thin glass 10. The polarizing plate 20 includes a polarizer 21 and a protective film 22 arranged on a surface of the polarizer 21 on a thin glass 10 side (i.e., between the polarizer 21 and the thin glass 10). The polarizing plate may further include another protective film arranged on a surface of the polarizer on a side opposite to the thin glass, though the protective film is not shown in the figure. The thin glass 10 and the polarizing plate 20 are preferably laminated on each other through intermediation of an adhesion layer 30.

The optical laminate 100 of the present invention, which includes the thin glass 10, has a high hardness. In addition, the optical laminate 100 of the present invention, which includes the polarizing plate on one side of the thin glass 10, can be prevented from breakage of the thin glass 10, and is excellent in impact resistance. It is considered that, in the present invention, an impact on a surface of the thin glass (a surface on a side opposite to the polarizing plate) can be released effectively to a polarizing plate side, and hence the optical laminate is excellent in impact resistance as described above. Such effect becomes more remarkable when the polarizing plate includes the protective film or the thin glass and the polarizing plate are laminated on each other through intermediation of the adhesion layer. Further, the thin glass is less liable to be broken, and hence is allowed to have an extremely small thickness, with the result that a lightweight optical laminate can be obtained. The optical laminate, which is excellent in impact resistance and has a light weight and a high hardness as described above, can be suitably used as a front plate of an image display apparatus for mobile applications. When the optical laminate of the present invention is used as a front plate, the optical laminate is preferably arranged with its thin glass side on the outside (i.e., on a viewer side).

Further, the thin glass 10 has a function of protecting the polarizing plats 20. That is, in the present invention, the thin glass 10 and the polarizing plate 20 protect each other. Thus, the number of protective members can be reduced, and a lightweight and thin optical laminate can be obtained. In addition, the thin glass has high gas barrier property, and hence, in the optical laminate of the present invention having a configuration in which the thin glass protects the polarizing plate, deterioration of the polarizer incorporated in the polarizing plate can be prevented.

The thickness of the optical laminate of the present invention is preferably from 1 μm to 300 μm, more preferably from 10 μm to 200 μm, still more preferably from 20 μm to 150 μm.

The optical laminate of the present invention may further include other layers. Examples of the other layers include an antireflection layer, an antiglare layer, an antistatic layer, and a conductive layer. In addition, any appropriate pressure-sensitive adhesive layer may be arranged on a surface of the polarizing plate on a side opposite to the thin glass. In an optical laminate including a pressure-sensitive adhesive layer, a separator may be arranged on a surface of the pressure-sensitive adhesive layer. The separator can protect the pressure-sensitive adhesive layer until the optical laminate is put into practical use.

In one embodiment, the optical laminate of the present invention is provided in a roll form. It is one of the accomplishments of the present invention that an optical laminate having such flexibility that the optical laminate can be taken up in a roll form while having a high hardness can be provided.

B. Thin Glass

Any appropriate thin glass may be adopted as the thin glass as long as the thin glass has a sheet shape. According to classification based on composition, examples of the thin glass include soda-lime glass, borate glass, aluminosilicate glass, and quartz glass. In addition, according to classification based on an alkali component, examples of the thin glass include alkali-free glass and low-alkali glass. The content of an alkali metal component (e.g., $Na_2O$, $K_2O$, $Li_2O$) in the glass is preferably 15 wt % or less, more preferably 10 wt % or less.

The thin glass has a thickness of 100 μm or less, preferably 80 μm or less, more preferably 50 μm or less, still more preferably 40 μm or less, particularly preferably 35 μm or less. The lower limit of the thickness of the thin glass is preferably 5 μm or more, more preferably 20 μm or more.

The thin glass preferably has a light transmittance at a wavelength of 550 nm of 85% or more. The thin glass preferably has a refractive index at a wavelength of 550 nm of from 1.4 to 1.65.

The thin, glass has a density of preferably from 2.3 g/cm$^3$ to 3.0 g/cm$^3$, more preferably from 2.3 g/cm$^3$ to 2.7 g/cm$^3$. When the thin glass has a density falling within the above-mentioned range, a lightweight optical laminate is obtained.

Any appropriate method may be adopted as a forming method for the thin glass. The thin glass is typically produced by melting a mixture containing a main raw material, such as silica or alumina, a fining agent, such as salt cake or antimony oxide, and a reducing agent, such as carbon, at a temperature of from 1,400° C. to 1,600° C., and forming the molten mixture into a thin sheet shape, followed by cooling. Examples of the forming method for the thin glass include a slot down-draw method, a fusion method, and a float method. The thin glass formed as a sheet shape by any of those methods may be chemically polished with a solvent, such as hydrofluoric acid, as required, in order to reduce its thickness or enhance its smoothness.

As the thin glass, commercially available thin glass may be used as it is, or commercially available thin glass may be used after being polished so as to have a desired thickness. Examples of the commercially available thin glass include "7059", "1737", or "EAGLE 2000" manufactured by Corning Incorporated, "AN100" manufactured by Asahi Glass Co., Ltd., "NA-35" manufactured by NH Techno Glass Corporation, "OA-10" manufactured by Nippon Electric Glass Co., Ltd., and "D 263" or "AF 45" manufactured by Schott AG.

C. Polarizing Plate

The polarizing plate includes a polarizer. The polarizing plate preferably further includes a protective film on one side or each of both sides of the polarizer. In one embodiment, the polarizing plate includes a protective film only on a thin glass side of the polarizer (i.e., between the polarizer and the thin glass). With such configuration, a polarizing plate which is excellent in durability of the polarizer and has a light weight can be provided. In addition, a protective effect on the thin glass can be increased by virtue of the protective film.

C-1. Polarizer

The thickness of the polarizer is not particularly limited, and an appropriate thickness may foe adopted depending on purposes. The thickness is typically from about 1 μm to about 80 μm. In one embodiment, a thin polarizer is used, and the thickness of the polarizer is preferably 20 μm or less, more preferably 15 μm or less, still more preferably 10 μm or less, particularly preferably 6 μm or less. With the use of such thin polarizer, a thin optical laminate can be obtained.

The polarizer preferably exhibits absorption dichroism at any wavelength in the wavelength range of from 380 nm to 780 nm. The polarizer has a single axis transmittance of preferably 40.0% or more, more preferably 41.0% or more, still more preferably 42.0% or more, particularly preferably 43.0% or more. The polarizer has a polarization degree of preferably 99.8% or more, more preferably 99.9% or more, still more preferably 93.95% or more.

The polarizer is preferably an iodine-based polarizer. More specifically, the polarizer may be formed of an iodine-containing polyvinyl alcohol-based resin (hereinafter referred to as "PVA-based resin") film.

Any appropriate resin may be adopted as a PVA-based resin for forming the PVA-based resin film. Examples of the resin include polyvinyl alcohol and an ethylene-vinyl alcohol copolymer. The polyvinyl alcohol is obtained by saponifying polyvinyl acetate. The ethylene-vinyl alcohol copolymer is obtained by saponifying an ethylene-vinyl acetate copolymer. The saponification degree of the PVA-based resin is typically from 85 mol % to 100 mol %, preferably from 95.0 mol % to 99.95 mol %, more preferably from 99.0 mol % to 99.93 mol %. The saponification degree may be determined in conformity with JIS K 6726-1994. The use of the PVA-based resin having such saponification degree can provide a polarizer excellent in durability. When the saponification degree is excessively high, gelling may occur.

The average polymerization degree of the PVA-based resin may be appropriately selected depending on purposes. The average polymerization degree is typically from 1,000 to 10,000, preferably from 1,200 to 5,000, more preferably from 1,500 to 4,500. The average polymerization degree may be determined in conformity with JIS K 6726-1994.

A production method for the polarizer is, for example, a method (I) including stretching and dyeing a PVA-based resin film alone, or a method (II) including stretching and dyeing a laminate (i) having a resin substrate and a polyvinyl alcohol-based resin layer. Detailed description of the method (I) is omitted because the method is well known and conventionally used in the art. The production method (II) preferably includes the step of stretching and dyeing the laminate (i) having the resin substrate and the polyvinyl alcohol-based resin layer formed on one side of the resin substrate to produce a polarizer on the resin substrate. The laminate (i) may be formed by applying an application liquid containing a polyvinyl alcohol-based resin onto the resin substrate and drying the applied liquid. In addition, the laminate (i) may be formed by transferring a polyvinyl alcohol-based resin film onto the resin substrate. For example, details about the production method (II) are described in JP 2012-73530 A, which is incorporated herein by reference.

C-2. Protective Film

Any appropriate resin film may be adopted as the protective film. As a material for forming the protective film, there are given, for example: a polyester-based resin, such as polyethylene terephthalate (PET); a cellulose-based resin, such as triacetylcellulose (TAC); a cycloolefin-based resin, such as a norbornene-based resin; an olefin-based resin, such as polyethylene or polypropylene; and a (meth)acrylic resin. Of those, polyethylene terephthalate (PET) is preferred. The term "(meth)acrylic resin" refers to an acrylic resin and/or a methacrylic resin.

In one embodiment, a (meth)acrylic resin having a glutarimide structure is used as the (meth)acrylic resin. The (meth)acrylic resin having a glutarimide structure (hereinafter sometimes referred to as glutarimide resin) is described in, for example, JP 2006-309033 A, JP 2006-317560 A, JP 2006-328329 A, 2006-328334 A, JP 2006-337491 A, JP 2006-337492 A, JP 2006-337493 A, JP 2006-337569 A, JP 2007-009182 A, JP 2009-161744 A, and JP 2010-284840 A. The descriptions thereof are incorporated herein by reference.

The resin film constituting the protective film preferably has an ability to absorb ultraviolet rays. Such resin film may be obtained by, for example, incorporating any appropriate ultraviolet absorber. Specific examples of the ultraviolet absorber include an oxybenzophenone-based compound, a benzotriazole-based compound, a salicylic acid ester-based compound, a benzophenone-based compound, a cyanoacrylate-based compound, a nickel complex salt-based compound, and a triazine-based compound.

The content of the ultraviolet absorber in the resin film is preferably from 0.01 part by weight to 30 parts by weight, more preferably from 0.1 part by weight to 5 parts by weight with respect to 100 parts by weight of the resin film. When the content of the ultraviolet absorber falls within such range, a protective film having an ability to sufficiently absorb ultraviolet rays can be formed, and a polarizing plate capable of effectively protecting the thin glass can be obtained.

The resin film constituting the protective film is formed by any appropriate method. Examples of the film-forming method include a melt extrusion method, a solution casting method, a calender method, and a compression forming method. Of those, a melt extrusion method is preferred. In addition, the resin film may be subjected to a stretching treatment.

The protective film and the polarizer are laminated on each other through intermediation of any appropriate adhesive layer. A resin substrate used at the time of the production of the polarizer may be peeled before the lamination of the protective film and the polarizer, or after the lamination.

The thickness of the protective film is preferably from 5 μm to 55 μm, more preferably from 10 μm to 50 μm, still more preferably from 15 μm to 45 μm.

The modulus of elasticity of the protective film at 23° C. is preferably from 1.5 GPa to 10 GPa, more preferably from 1.8 GPa to 9 GPa. When the modulus of elasticity of the protective film falls within such range, a polarizing plate capable of effectively protecting the thin glass can be obtained. The modulus of elasticity in the present invention may be measured by dynamic viscoelastic spectrum measurement.

The fracture toughness value of the protective film at 25° C. is from 1.5 MPa·m$^{1/2}$ to 10 MPa·m$^{1/2}$, preferably from 2 MPa·m$^{1/2}$ to 6 MPa·m$^{1/2}$, still more preferably from 2 MPa·m$^{1/2}$ to 5 MPa·m$^{1/2}$. When the fracture toughness value of the protective film falls within such range, the protective film has sufficient toughness, and hence can reinforce the thin glass to prevent development of cracks in the thin glass and rupture of the thin glass, resulting in an optical laminate excellent in bending property.

The coefficient of linear expansion of the protective film is preferably more, than 0/° C., more preferably from $1.0 \times 10^{-6}$/° C. to $10 \times 10^{-6}$/° C., still more preferably from $4.0 \times 10^{-6}$/° C. to $50 \times 10^{-6}$/° C. The coefficient of linear expansion is determined in conformity with JIS K 7197.

D. Other Layers

D-1. Resin Film

The optical laminate of the present invention may further include a resin film on a side the thin glass opposite to the polarizing plate. In one embodiment, the resin film is peelably laminated (e.g., through intermediation of any appropriate pressure-sensitive adhesive layer), and protects the thin glass until the optical laminate of the present invention is put into use.

Any appropriate resin may be adopted as a material for forming the resin film. Examples of such resin include a thermoplastic resin and a curable resin cured by heat or an active energy ray. The resin is preferably a thermoplastic resin. Specific examples of the thermoplastic resin include a poly(meth)acrylate-based resin, a polycarbonate-based resin, a polyethylene-based resin, a polypropylene-based resin, a polystyrene-based resin, a polyamide-based resin, a polyethylene terephthalate-based resin, a polyarylate-based resin, a polyimide-based resin, a polysulfone-based resin, and a oycloolefin-based, resin. Of those, a poly(meth) acrylate-based resin is preferred, apolymathacrylate-based resin is more preferred, and a polymethyl methacrylate-based resin is particularly preferred. When the resin film contains a polymethyl methacrylate-based resin, a protective effect on the thin glass is increased, and for example, the generation of flaws, holes, etc. can be prevented even against a sharpened fallen object.

The thickness of the resin film is preferably from 20 μm to 1,900 μm, more preferably from 50 μm to 1,500 μm, still more preferably from 50 μm to 1,000 μm, particularly preferably from 50 μm to 100 μm.

The specific gravity of the resin film is from 0.9 g/cm$^3$ to 1.5 g/cm$^3$, preferably from 1 g/cm$^3$ to 1.3 g/cm$^3$.

The resin film may further contain any appropriate additive depending on purposes. Examples of the additive in the resin film include a diluent, an antioxidant, a modifier, a surfactant, a dye, a pigment, a discoloration preventing agent, an ultraviolet absorber, a softening agent, a stabilizer, a plasticizer, an antifoaming agent, and a reinforcing agent. The kinds, number, and amounts of the additives to be contained in the resin film may be appropriately set depending on purposes.

D-2. Antireflection Layer

The optical laminate of the present invention may further include an antireflection layer. The antireflection layer may be arranged on a side of the thin glass opposite to the polarizing plate.

The antireflection layer may have any appropriate configuration as long as the antireflection layer has an antireflection function. The antireflection layer is preferably a layer formed of an inorganic material.

As a material for forming the antireflection layer, there are given, for example, titanium oxide, zirconium oxide, silicon oxide, and magnesium fluoride. In one embodiment, a laminate obtained by alternately laminating a titanium oxide layer and a silicon, oxide layer is used as the antireflection layer. Such laminate has an excellent antireflection function.

D-3. Adhesion Layer

The thin glass and the polarizing plate may be laminated on each other through intermediation of an adhesion layer. As a material for forming the adhesion layer, there are given, for example, a thermosetting resin and an active energy ray curable resin. Specific examples of such resin include an epoxy-based resin; a cyclic ether having an epoxy group, a glycidyl group, or an oxetanyl group; a silicone-based resin; an acrylic resin; and a mixture thereof. An adhesion, layer containing preferably an epoxy-based resin, out of those resins may be formed. When the adhesion layer containing an epoxy-based resin is formed, an optical laminate in which the thin glass is less liable to be broken and which is excellent in impact resistance can be obtained. In addition, a coupling agent may be added to the adhesion layer.

The thickness of the adhesion layer is preferably 10 μm or less, more preferably from 0.05 μm to 50 μm. When the thickness of the adhesion layer falls within such range, an optical laminate in which the thin glass is less liable to be broken and which is excellent in impact resistance can be obtained.

E. Production Method for Optical Laminate

Any appropriate method may be adopted as a production method for the optical laminate of the present invention. The production method includes, for example: (1) a bonding step of bonding a polarizing plate onto one surface of a thin glass with an adhesive composition; and (2) a curing step of curing the adhesive composition to form an adhesion layer.

As described above, the adhesive composition preferably includes a thermosetting adhesive or a photocurable adhesive. The thermosetting adhesive and the photocurable adhesive may be used in combination. Adhesives containing the resins described in the section D-3 may be used as those adhesives.

The adhesive composition may further contain any appropriate additive depending on purposes. Examples of such additive to be contained in the adhesive composition include at polymerization initiator, a cross-linking agent, an ultraviolet absorber, a conductive material, and a Si coupling agent.

The bonding of the thin glass and the polarizing plate or the resin film is performed by any appropriate means. The bonding is typically performed by lamination. For the optical laminate of the present invention, the bonding of the thin glass and the resin film may be continuously performed by a so-called roll-to-roll process. The roll-to-roll process refers to a method involving continuously bonding elongated films to each other (the thin glass and the resin film in the present invention) with their longitudinal directions aligned while conveying these films with rolls.

A curing method for the adhesive composition may be appropriately selected depending on the kind of the adhesive. When the adhesive is a photocurable adhesive, the adhesive composition may be cured by ultraviolet irradiation. The irradiation conditions may be appropriately selected depending on, for example, the kind of the adhesive and the composition of the adhesive composition. A cumulative irradiation light amount for curing the adhesive composition having been applied is, for example, from 100 mJ/cm$^2$ to 2,000 mJ/cm$^2$. When the adhesive is a thermosetting adhesive, the adhesive composition is cured by heating. The heating conditions may be appropriately selected depending on, for example, the kind of the adhesive and the composition of the adhesive composition. The heating conditions for curing the adhesive composition having been applied are, for example, as follows: a temperature of from 100° C. to 200° C. and a heating time of from 5 minutes to 30 minutes.

When the optical laminate of the present invention includes the antireflection layer, the antireflection layer is formed by any appropriate method. For example, the antireflection layer is formed on the thin glass by a vacuum deposition method, a sputtering method, an ion plating method, and the like. In addition, the antireflection layer may be formed by transferring a film having an antireflection function through use of the resin film described in the section E-1.

REFERENCE SIGNS LIST

10 thin glass
20 polarizing plate
100 optical laminate

The invention claimed is:

1. An image display apparatus, comprising an optical laminate as a front plate, the optical laminate comprising
   a thin glass having a thickness of 100 μm or less,
   a polarizing plate arranged on one side of the thin glass, and
   an adhesion layer between the thin glass and the polarizing plate,
   the thin glass being directly arranged on a side of the adhesion layer and the polarizing plate being directly arranged on a side of the adhesion layer opposite the thin glass
   wherein the polarizing plate comprises a polarizer and a protective film arranged directly on a surface of the polarizer between the polarizer and the thin glass,
   the thin glass and the polarizing plate are bonded by a roll-to-roll process,
   the optical laminate is arranged with its thin glass side as an outermost surface of the image display apparatus on a viewer side, and
   the protective film has a modulus of elasticity at 23° C. of from 1.5 GPa to 10 GPa.

2. The image display apparatus according to claim 1, wherein the adhesion layer contains an epoxy-based resin.

3. The image display apparatus according to claim 1, wherein the optical laminate further comprises an antireflection layer, wherein the antireflection layer is arranged on a side of the thin glass opposite to the polarizing plate.

* * * * *